(12) United States Patent
Schmid et al.

(10) Patent No.: US 7,571,096 B2
(45) Date of Patent: Aug. 4, 2009

(54) SPEECH RECOGNITION USING A STATE-AND-TRANSITION BASED BINARY SPEECH GRAMMAR WITH A LAST TRANSITION VALUE

(75) Inventors: Philipp H. Schmid, Seattle, WA (US); Ralph Lipe, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/857,018

(22) Filed: Sep. 18, 2007

(65) Prior Publication Data

US 2008/0046242 A1   Feb. 21, 2008

Related U.S. Application Data

(62) Division of application No. 11/178,043, filed on Jul. 8, 2005, now Pat. No. 7,283,959, which is a division of application No. 09/778,479, filed on Feb. 7, 2001, now Pat. No. 7,024,350.

(60) Provisional application No. 60/219,861, filed on Jul. 20, 2000.

(51) Int. Cl.
G10L 15/18 (2006.01)
G10L 15/26 (2006.01)

(52) U.S. Cl. .......................... 704/255; 704/9

(58) Field of Classification Search ............ 704/9, 704/252, 255
See application file for complete search history.

(56) References Cited

U.S. PATENT DOCUMENTS

| | | | |
|---|---|---|---|
| 5,619,718 A | 4/1997 | Correa | 704/9 |
| 5,719,997 A | 2/1998 | Brown et al. | 704/257 |
| 5,778,341 A | 7/1998 | Zelijkovic | 704/256 |
| 5,812,975 A | 9/1998 | Komori et al. | 704/256 |
| 5,870,706 A | 2/1999 | Alshawi | 704/255 |
| 5,907,634 A | 5/1999 | Brown et al. | 382/226 |
| 5,995,918 A | 11/1999 | Kendall et al. | 704/1 |
| 6,023,697 A | 2/2000 | Bates et al. | 707/4 |
| 6,073,098 A * | 6/2000 | Buchsbaum et al. | 704/255 |
| 6,243,679 B1 * | 6/2001 | Mohri et al. | 704/256.8 |
| 6,260,186 B1 | 7/2001 | James | 717/104 |
| 6,266,634 B1 | 7/2001 | Buchsbaum et al. | 704/232 |
| 6,278,973 B1 | 8/2001 | Chung et al. | 704/257 |
| 6,285,785 B1 * | 9/2001 | Bellegarda et al. | 382/187 |
| 6,374,222 B1 | 4/2002 | Kao | 704/256.1 |

(Continued)

OTHER PUBLICATIONS

J. H. Reed, "Compiling Phrase Structure Grammar Rules Into Register Vector Grammar," Proceedings of the Annual AI Systems in Government Conference, IEEE Cat. No. 89CH2715-1, pp. 244-249 (Mar. 27-31, 1989).

(Continued)

*Primary Examiner*—Talivaldis Ivars Smits
(74) *Attorney, Agent, or Firm*—Theodore M. Magee; Westman, Champlin & Kelly, P.A.

(57) ABSTRACT

A computer-loadable data structure is provided that represents a state-and-transition-based description of a speech grammar. The data structure includes first and second transition entries that both represent transitions from a first state. The second transition entry is contiguous with the first transition entry in the data structure and includes a last-transition value. The last-transition value indicates that the second transition is the last transition from the first state in the data structure.

11 Claims, 12 Drawing Sheets

U.S. PATENT DOCUMENTS

| | | |
|---|---|---|
| 6,757,652 B1 | 6/2004 | Lund et al. .................. 704/254 |
| 6,839,669 B1 | 1/2005 | Gould et al. ................ 704/246 |
| 6,895,117 B1 | 5/2005 | Klemm et al. .............. 382/226 |

OTHER PUBLICATIONS

T.B. Williams, "Hierarchical Parsing", Second Annual Phoenix Conference on Computers and Communications, pp. 427-430 (Mar. 14-16, 1983).

L.A. Harris, "SLR(1) and LALR(1) Parsing For Unrestricted Grammars," *Acta Informatica*, vol. 24, No. 2, pp. 191-209 (1987).

T. Aizawa et al. "English-to-Japanese Machine Translation For Wire-Service Economic News," *Transactions of the Information Processing Society of Japan*, vol. 37, No. 6, pp. 1041-1048 (Jun. 1996).

Shapiro, Stuart, "Generalized Augmented Transition Network Grammars for Generation From Semantic Networks," Mar. 1982, American Journal of Computational Linguistics, vol. 8, No. 1, pp. 12-25.

Woods, W.A., "Transition Network Grammars for Natural Language Analysis," Oct. 1970, Communications of the ACM, vol. 13, No. 10, pp. 591-606.

Green, Mark, "A Survey of Three Dialogue Models," Jul. 1986, ACM Transactions on Graphics, vol. 5, No. 3, pp. 244-275.

Office Actions and Responses for both U.S. Appl. No. 11/178,043 and U.S. Appl. No. 09/778,479.

\* cited by examiner

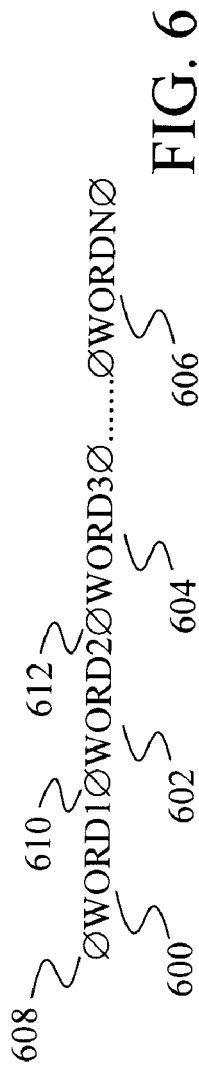
FIG. 6
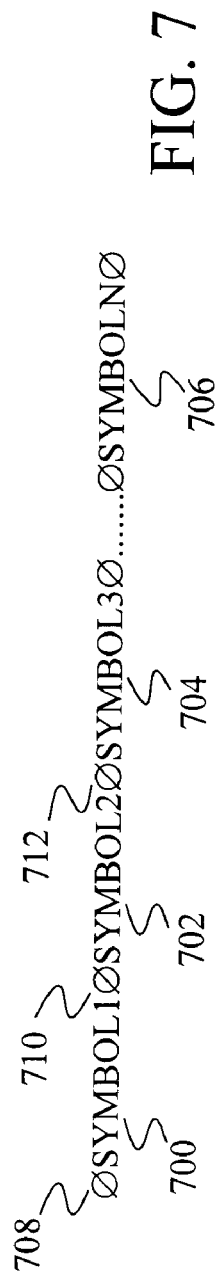
FIG. 7
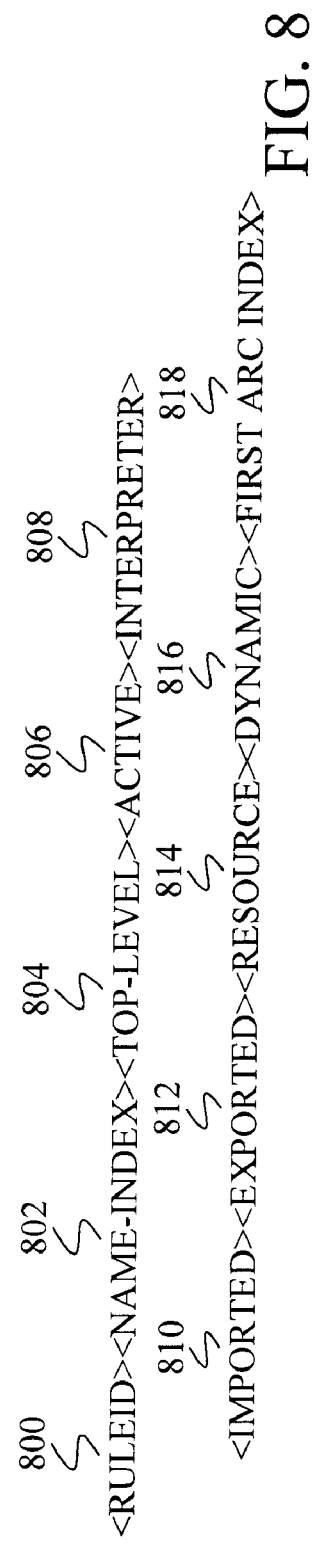
FIG. 8
FIG. 9

FIG. 10

1000   1002
<ARC INDEX><WEIGHT>

FIG. 11

1100   1102      1104            1106     1108
<ARC INDEX><NAME OFFSET><VALUE OFFSET><NAME ID><VALUE ID>
          1110              1112         1114         1116
<START ARC INDEX><PARALLEL FLAG><END ARC INDEX><PARALLEL FLAG>

FIG. 12

1200       1202
<RULEINDEX><RESOURCE INDEX>

ØPLEASEØMOVEØTHEØACEØQUEENØOFØCLUBSØSPADESØHEARTSØDIAMONDSØ

ØMOVEØMOVECARDØ1ØCARDØSUITØREDØ0Ø1Ø1.0Ø.8Ø.2Ø

| RULE ID | NAME INDEX | TOP | ACTIVE | INTERPT | IMPORT | EXP | RES | DYN | FIRST ARC INDEX |
|---|---|---|---|---|---|---|---|---|---|
| 01 | 01 | 1 | 1 | 0 | 0 | 1 | 0 | 0 | 01 |
| 02 | 17 | 0 | 1 | 0 | 0 | 1 | 0 | 0 | 08 |
| 03 | 22 | 0 | 1 | 0 | 0 | 1 | 0 | 0 | 12 |

| WORD /RULE INDEX | RULE REF | LAST | NEXT ARC | SEM TAG |
|---|---|---|---|---|
| 0 | 0 | 1 | 0 | 0 |
| 0 | 0 | 0 | 3 | 0 |
| 1 | 0 | 1 | 3 | 0 |
| 8 | 0 | 1 | 4 | 1 |
| 13 | 0 | 1 | 5 | 0 |
| 2 | 1 | 1 | 6 | 0 |
| 0 | 0 | 0 | 0 | 0 |
| 1 | 0 | 1 | 0 | 0 |
| 17 | 0 | 0 | 10 | 0 |
| 21 | 0 | 1 | 10 | 0 |
| 27 | 0 | 1 | 11 | 0 |
| 3 | 1 | 1 | 0 | 0 |
| 30 | 0 | 0 | 0 | 1 |
| 36 | 0 | 0 | 0 | 0 |
| 43 | 0 | 0 | 0 | 0 |
| 50 | 0 | 1 | 0 | 1 |

FIG. 19

| ARC INDEX | WEIGHT |
|---|---|
| 1 | 35 |
| 2 | 35 |
| 3 | 35 |
| 4 | 35 |
| 5 | 35 |
| 6 | 35 |
| 7 | 35 |
| 8 | 39 |
| 9 | 42 |
| 10 | 35 |
| 11 | 35 |
| 12 | 35 |
| 13 | 35 |
| 14 | 35 |
| 15 | 35 |

FIG. 20

| | ARC INDEX 2106 | NAME OFFSET 2108 | VALUE OFFSET 2110 | NAME ID 2112 | VALUE ID 2114 | START ARC INDEX 2116 | PARALLEL FLAG 2118 | END ARC INDEX 2120 | PARALLEL FLAG 2122 |
|---|---|---|---|---|---|---|---|---|---|
| 2100 | 3 | 6 | 15 | 100 | 1 | 2 | 1 | 7 | 1 |
| 2102 | 12 | 27 | 31 | 200 | 0 | 12 | 0 | 12 | 0 |
| 2104 | 15 | 27 | 33 | 200 | 1 | 15 | 0 | 15 | 0 |

FIG. 21

SPEECH RECOGNITION USING A STATE-AND-TRANSITION BASED BINARY SPEECH GRAMMAR WITH A LAST TRANSITION VALUE

REFERENCE TO RELATED APPLICATION

This application is a divisional of and claims priority from U.S. patent application Ser. No. 11/178,043 filed on Jul. 8, 2005, which was a divisional of and claimed priority from U.S. patent application Ser. No. 09/778,479 filed on Feb. 7, 2001, which claimed the benefit of U.S. Provisional Application 60/219,861, filed on Jul. 20, 2000 and entitled "MICROSOFT SPEECH SDK (SAPI 5.0)".

BACKGROUND OF THE INVENTION

The present invention relates to the construction of grammars used in speech recognition. In particular, the invention relates to the construction of grammars in a binary format.

In speech recognition systems, a computer system attempts to identify a sequence of words from a speech signal. One way to improve the accuracy of the recognition is to limit the recognition to a set of selected phrases. This is typically done by limiting valid recognition hypothesis to phrases that are found in a context-free grammar (CFG).

One common method for describing phrases in a context-free grammar is to use a Recursive Transition Network description. Under such RTNs, each word in a phrase is represented by a transition between two states. Multiple transitions can extend from a single phrase, allowing multiple phrases to be represented by a single RTN structure. For example, the phrase "go back" and the phrase "go forward" can be represented by a single RTN structure with a first transition extending between a first state and a second state to represent the word "go" and two parallel transitions extending between the second state and a third state to represent the words "back" and "forward", respectively.

In the past, the binary version of the context-free grammar included a description of the RTN structures that explicitly recited each state and each transition. Since each description of a state or transition requires some amount of memory, each description adds to the size of the binary grammar.

In addition, binary grammars of the past generated records for each transition that included both the transition's position in the structure and the actual word or semantic tag associated with the transition. Because the words and tags are of variable lengths, prior art grammars either had to make the records a fixed size that was large enough to accommodate all possible words, or a variable size. If the records were made a fixed size, almost all of the transition records would include unused space making the binary grammar wastefully large. If variable length records are used, parsing the grammar to retrieve information becomes very difficult because the grammar must be searched to find the right record.

There is also a need for a binary grammar that includes several different types of records that reference one another in such a way that if the binary grammar were loaded into memory, the references could be used directly to retrieve desired information without having to first resolve one or more pointers.

SUMMARY OF THE INVENTION

A computer-loadable data structure is provided that represents a state-and-transition-based description of a speech grammar. The data structure includes first and second transition entries that both represent transitions from a first state. The second transition entry is contiguous with the first transition entry in the data structure and includes a last-transition value. The last-transition value indicates that the second transition is the last transition from the first state in the data structure. By using such a last-transition value, the present invention is able to avoid including an explicit description of states in the data structure.

BRIEF DESCRIPTION OF THE DRAWINGS

FIG. 6 shows the layout of a word string entry under one embodiment of the present invention.

FIG. 7 shows the layout of a symbol string entry under one embodiment of the present invention.

FIG. 8 shows the layout of a rule entry under one embodiment of the present invention.

FIG. 9 shows the layout of a transition entry under one embodiment of the present invention.

FIG. 10 shows the layout of a weight entry under one embodiment of the present invention.

FIG. 11 shows the layout of a semantic property entry under one embodiment of the present invention.

FIG. 12 shows the layout of a resource entry under one embodiment of the present invention.

FIG. 16 shows the content of a word string for a binary grammar that describes the rules of FIGS. 13, 14, and 15 under one embodiment of the present invention.

FIG. 17 shows the content of a symbol string for a binary grammar that describes the rules of FIGS. 13, 14, and 15 under one embodiment of the present invention.

FIG. 18 shows the content of a set of rule entries for a binary grammar that describes the rules of FIGS. 13, 14, and 15 under one embodiment of the present invention.

FIG. 19 shows the content of a set of transition entries for a binary grammar that describes the rules of FIGS. 13, 14, and 15 under one embodiment of the present invention.

FIG. 20 shows the content of a set of weight entries for a binary grammar that describes the rules of FIGS. 13, 14, and 15 under one embodiment of the present invention.

FIG. 21 shows the content of a set of semantic property entries for a binary grammar that describes the rules of FIGS. 13, 14, and 15 under one embodiment of the present invention.

DETAILED DESCRIPTION OF ILLUSTRATIVE EMBODIMENTS

Figure 1:
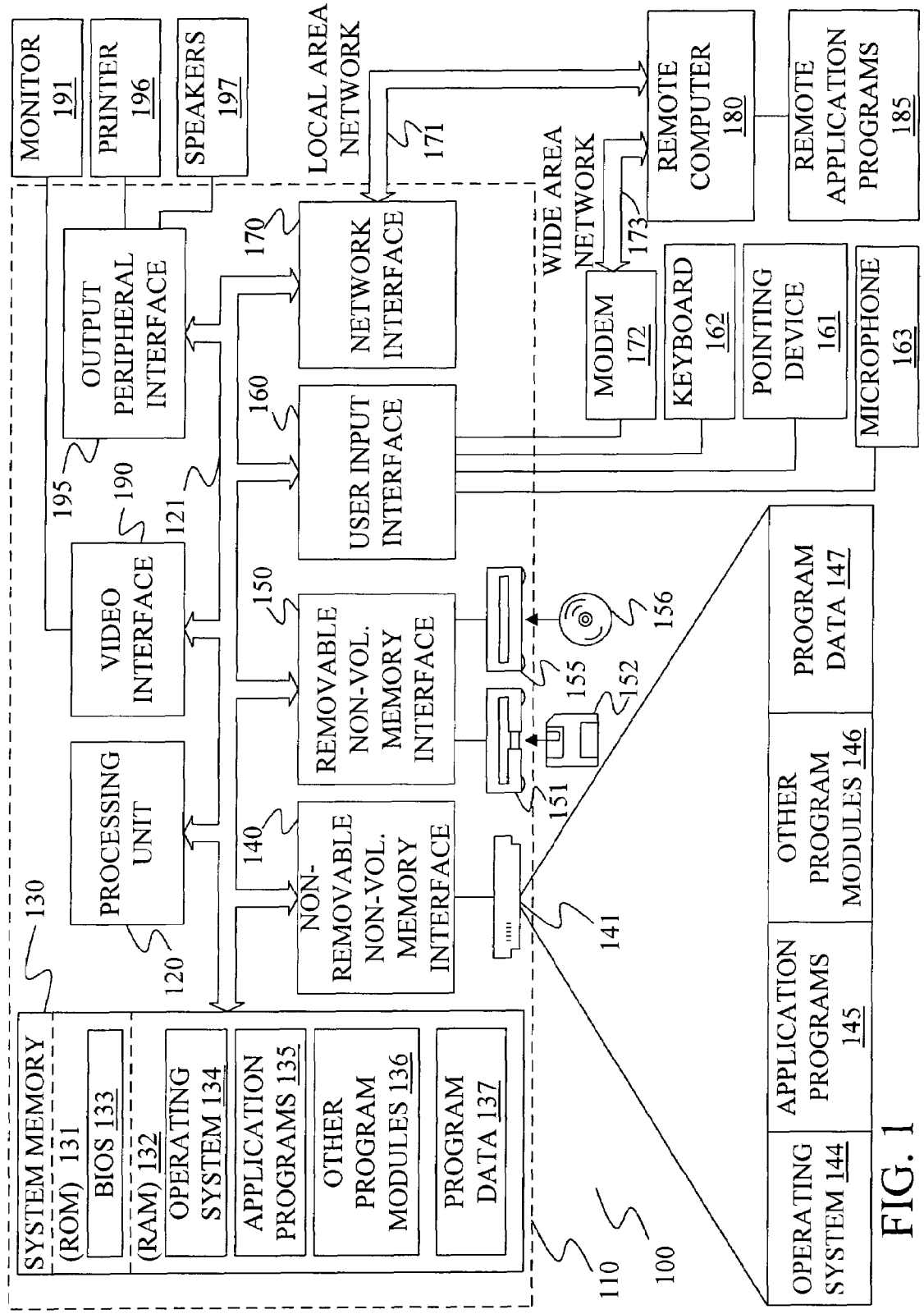
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, PAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD RON or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
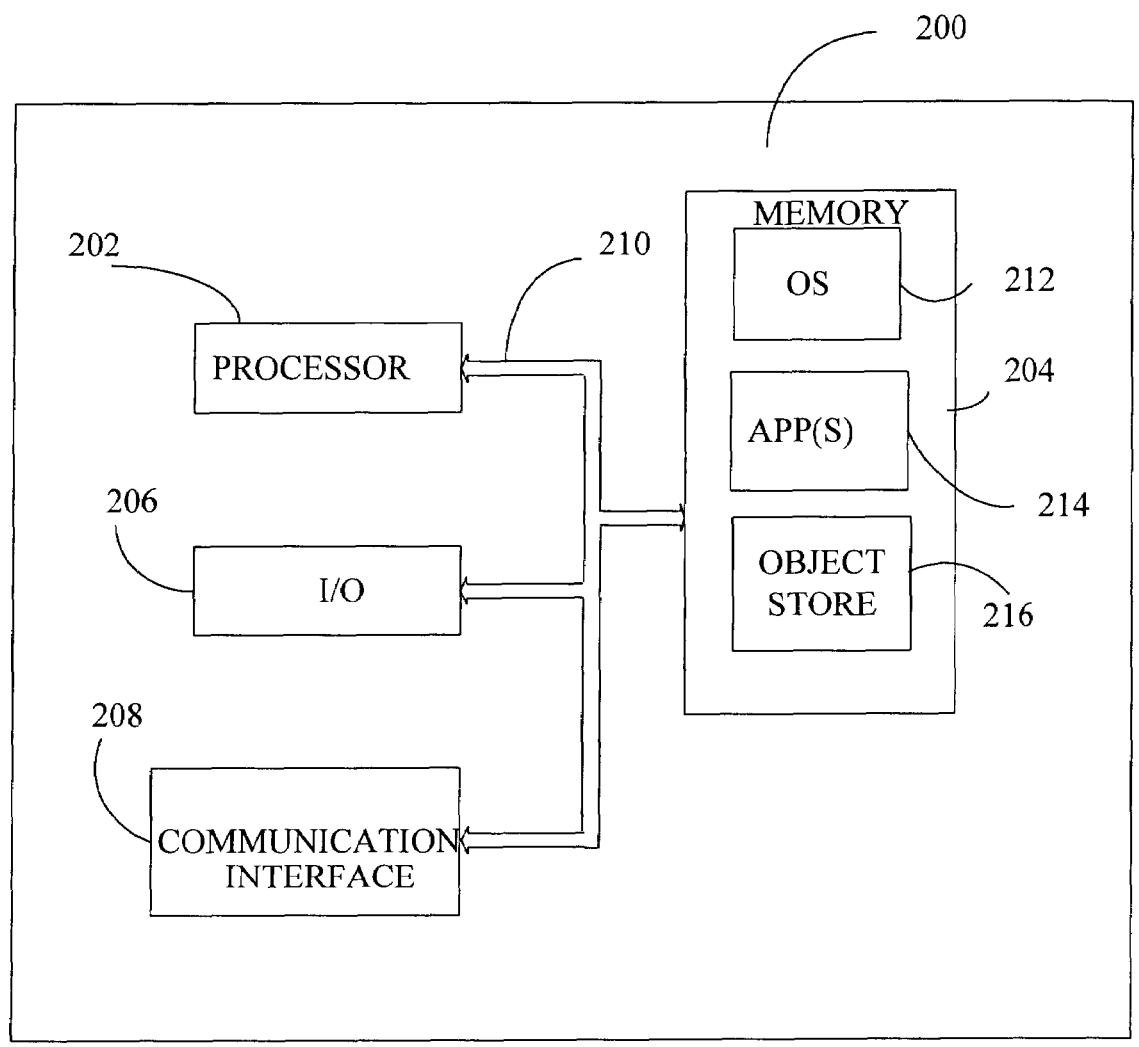
FIG. 2 is a block diagram of a mobile device in which the present invention may be practiced.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
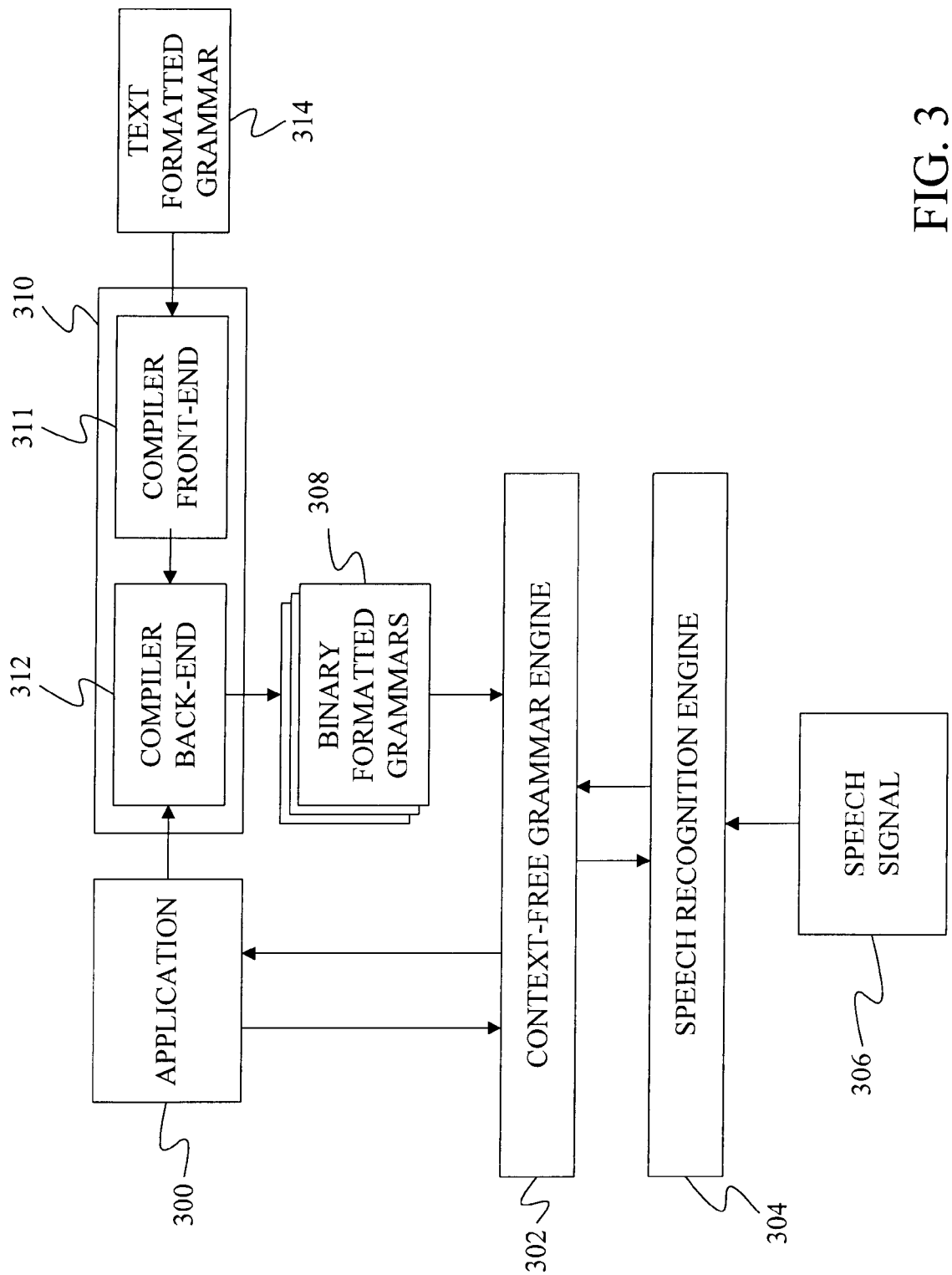
FIG. 3 is a block diagram of a speech recognition system under the present invention.

FIG. 3 provides a block diagram of a speech recognition system under one embodiment of the present invention. In FIG. 3, an application 300 utilizes a context-free grammar engine 302 and a speech recognition engine 304 to identify words and/or semantic meaning in a speech signal 306 that is provided to speech recognition engine 304. Specifically, during speech recognition, speech recognition engine 304 determines the likelihood that speech signal 306 represents one or more possible phrases found in a composite grammar maintained by context-free grammar engine 302.

Under one embodiment, the composite grammar in context-free grammar engine 302 is organized as a recursive transition network (RTN) that includes a collection of grammar structures known as rules. Each rule contains a collection of transitions that define one or more paths from a starting state to an ending state for the rule. Under these embodiments, each transition corresponds to the recognition of a recognition value such as a single word, the lack of a word (known as an epsilon transition), or the recognition of some other rule (known as a rule reference).

The composite grammar maintained by context-free grammar engine 302 is constructed from a collection of binary grammars 308 that are formed by a compiler 310. Compiler 310 includes a front end 311 and a back end 312. Compiler front-end 311 converts text-formatted grammars 314, which in one embodiment are XML tagged grammars, into a set of instructions for building a binary grammar. These instructions are passed to compiler back-end 312 and direct back-end 312 to build binary structures that represent particular rules (grammar structures) in a grammar.

In embodiments where the composite grammar is a recursive transition network, the instructions define new rules to be added to the network and the location and content of transitions to be added to each rule. Thus, the instructions indicate whether a transition is associated with a word, a lack of a word (an epsilon transition) or a rule. The instructions also indicate the identity of any semantic tag/semantic value pair that is to be associated with the transition.

Figure 4:
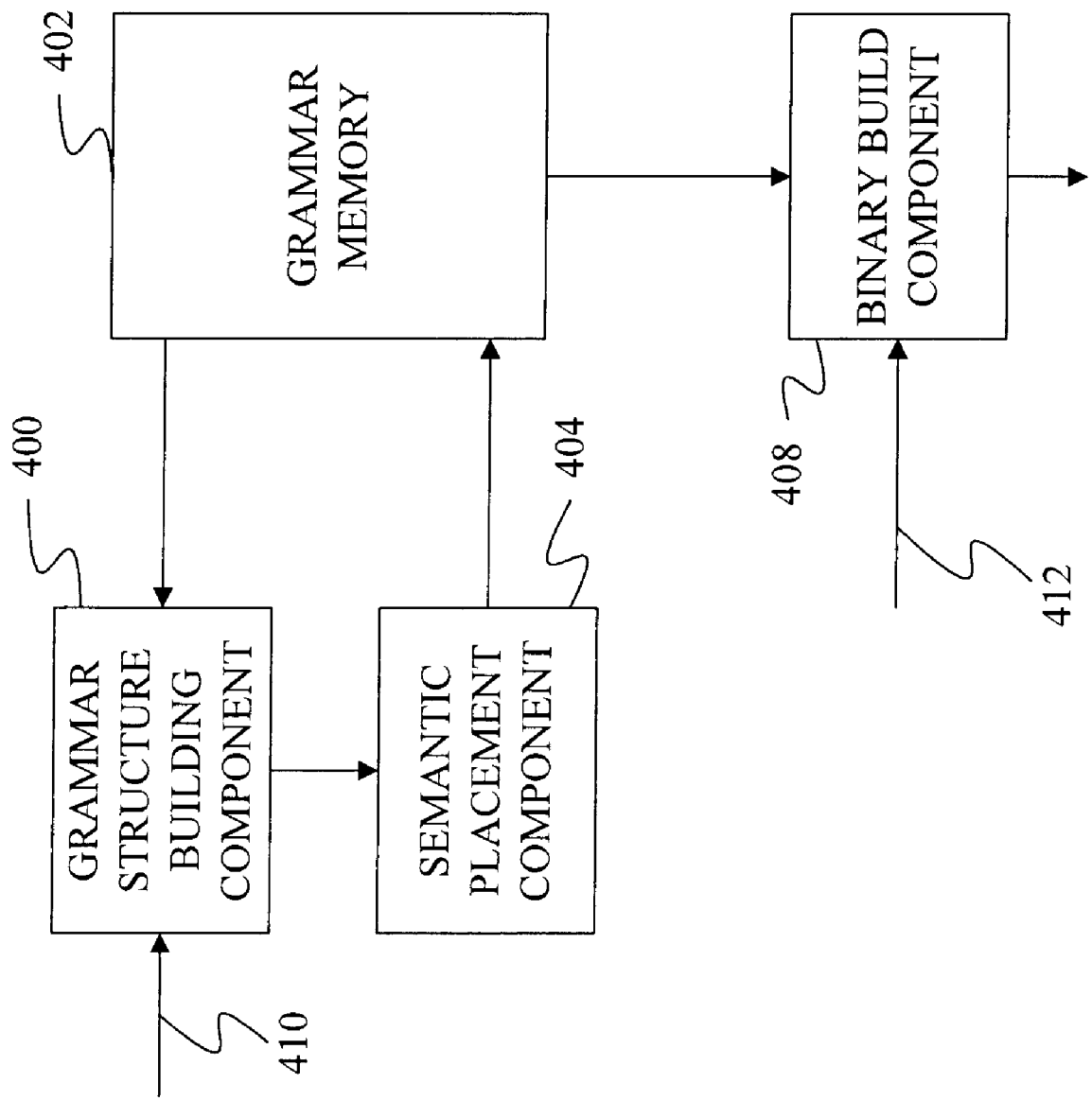
FIG. 4 is a block diagram of components in compiler back-end 412 of FIG. 4.

FIG. 4 shows a block diagram of some of the components that form compiler back-end 312 under some embodiments of the present invention. In FIG. 4, a grammar structure building component 400 receives instructions 410 to add transitions to a grammar structure stored in a grammar memory 402. After a transition has been added, a semantic placement component 404 is called that identifies the best location for semantic information associated with the current transition and/or the current grammar structure.

When compiler front-end 311 reaches the end of the text-formatted grammar, it instructs back-end 312 to commit the grammar. When it receives this instruction, shown as instruction 412 in FIG. 4, a binary build component 406 of back-end 312 takes the current form of the grammar in grammar memory 402 and constructs a compact binary representation 308 of the grammar. The format and characteristics of binary grammar 308 are described in more detail below.

Compiler back-end 312 may also receive grammar-building instructions directly from application 300 at run time. These instructions are generated by the application to produce one or more run-time grammars that are then added to the composite grammar used by context-free grammar engine 302. Like compiler front-end 311, application 300 is able to specify semantic tag/semantic value pairs for transitions that it wants added to the grammar.

During recognition, speech recognition engine 304 compares sections of the speech signal to acoustic models representing a set of phonetic units that can be spoken in the language of interest. From these comparisons, engine 304 identifies sequences of phonetic units that could be represented by the speech signal. When identifying the possible sequences, recognition engine 304 eliminates those sequences that do not occur in at least one of the grammar structures of the composite grammar.

The present invention provides an improved format for the binary grammars used by context-free grammar engine 302. This format makes the binary grammar more compact and easier to access than prior art grammars.

Figure 5:
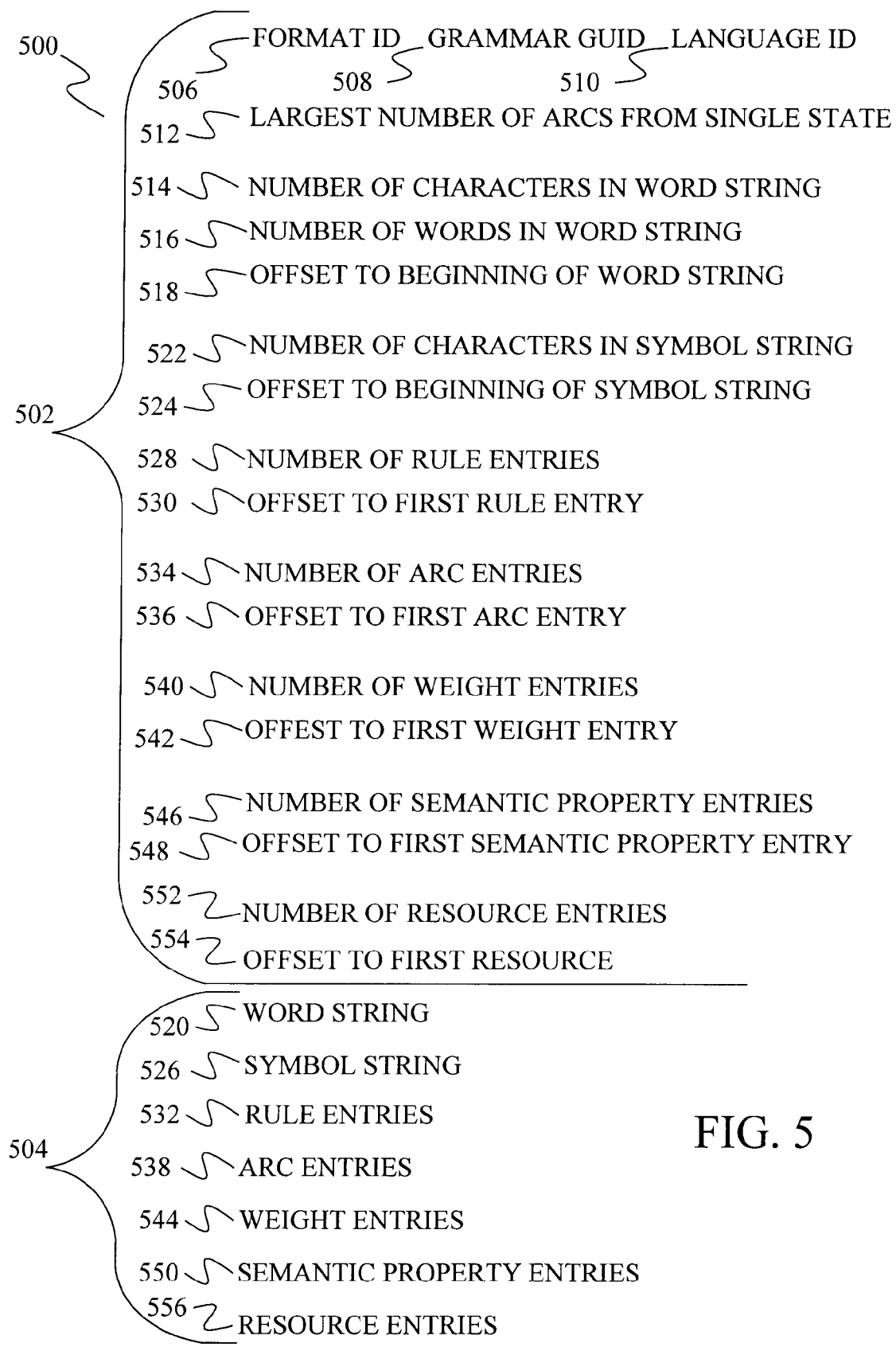
FIG. 5 shows the layout of a binary grammar data structure under one embodiment of the present invention.

The general layout of one embodiment of a binary grammar 500 of the present invention is shown in FIG. 5. The grammar contains a header section 502 and a data section 504.

Header section 502 provides general information regarding the grammar as well as layout information indicating the location and size of various types of data in data section 504. The general information includes things such as a FORMAT ID 506 and a GRAMMAR GUID 508 that both represent global unique identifiers for the grammar. Header 502 also includes a LANGUAGE ID 510 that identifies the spoken language represented by the grammar (i.e. English or French).

The layout information in header 502 allows a parsing program to quickly access information stored in data section 504 and allows it to allocate enough memory to manipulate the data if necessary. For example, header 502 includes an entry 512 that indicates the largest number of transitions or arcs that extend from a single state so that the parsing program can allocate enough space to handle all of these transitions.

The remaining information in header 502 is tied directly to a particular data entry in data section 504. For example, entries 514 and 516 describe the number of characters and nulls and the number of words, respectively, in a word string 520 in data section 504. Further, entry 518 describes the memory offset from the beginning of binary grammar 500 to the first character of word string 520

Word string 520 is a string of null-separated words. An example of the layout of word string 520 is shown in FIG. 6, where each word 600, 602, 604 and 606 is placed between two nulls such as nulls 608, 610, and 612. Each word in word string 520 appears at least once on a transition in the grammar. To save space, words that appear multiple times in the grammar only appear once in word string 520.

Entries 522 and 524 of header 502 provide information related to a symbol string 526 in data section 504. Entry 522 describes the total number of characters and nulls in symbol string 526 and entry 524 describes the memory offset from the beginning of grammar 500 to the first character in symbol string 526.

Symbol string 526 contains null-separated character strings that represent reference symbols such as semantic tags, semantic values, and rule names. An example of the layout of a symbol string 526 is shown in FIG. 7 where each symbol, such as symbols 700, 702, 704, and 706, is placed between two null characters, such as null characters 708, 710, and 712.

Entries 528 and 530 of header 502 describe the number of and location of rule entries 532 in data section 504. In particular, entry 528 indicates how many rule entries are in grammar 500 and entry 530 indicates the memory offset from the beginning of grammar 500 to the first character of the first rule entry in rule entries 532.

An example of the layout of each rule entry is shown in FIG. 8. Each entry consists of a set of fields that together describe a rule in the grammar. For instance, RULE ID field 800 and NAME-INDEX field 802 provide a rule identifier and a reference to a rule name, respectively, that can be used to identify the rule. Although RULE ID field 800 contains the actual rule identifier, NAME-INDEX field 802 does not contain the actual name of the rule. Instead, field 802 contains an index number that describes the location of the first character of the rule's name in symbol string 520. By keeping the actual name out of field 802, the present invention is able to keep the rule entries at a small fixed size since they do not have to accommodate variable length strings to represent rule names.

Fields 804, 806, 808, 810, 812, 814, and 816 are each single-bit flag fields that describe some characteristic of the rule. For example, TOP-LEVEL field 804 indicates whether the rule is a top-level rule, one that can represent an entire utterance, or a sub-rule that can only represent a part of an utterance.

ACTIVE field 806 indicates whether the rule should be activated when an application passes a generalized command to activate rules. If this bit is set to one, the rule will be activated by the generalized command. If this bit is zero, the rule can only be activated with a specific command to activate this particular rule.

INTERPRETER field 808 indicates whether this rule has an associated interpreter that is to be called when the rule is recognized. The location of the interpreter is maintained by the context-free grammar engine at run-time.

IMPORTED field 810 and EXPORTED filed 812 indicate whether this rule has been imported into the current grammar and whether the rule may be exported to other grammars. Under the present invention, rules may be imported and exported at run-time based on instructions from the application.

RESOURCE field 814 indicates whether or not the current rule has an associated resource. A resource is a string, file or network location that contains information that can be used by the speech recognition engine during recognition of this rule. The value of the resource is stored as a resource string in symbol string 526. For resources that are files or network locations, the string represents the address of the resource. In other embodiments, the resource string is interpreted as something other than an address. The location of the symbol in symbol string 526 is found in a list of resource entries 556, which are described below.

DYNAMIC field 816 indicates whether or not this rule is dynamic. A dynamic rule may have its structure changed at run time based on instructions from the application. Under one embodiment of the present invention, dynamic rules are placed at the end of rule entries 532 so that changes to these rules do not require changes to static rules in the grammar. By doing this, the grammar may be updated more quickly when a dynamic rule changes, since only the dynamic rule's transitions and words need to be changed.

FIRST ARC INDEX field 818 of each rule entry provides an index number for the first arc or starting transition associated with the rule. The index number is the entry number for the arc in a list of arc entries 538 provided in data section 504. Like the rule entries, each transition entry has a fixed size. Therefore, using the starting memory location of the arc entries 538, the fixed size of each entry, and the index number of the first transition for the rule, the location of the first transition can be easily calculated. Specifically, the location of the first transition for a rule is calculated as (index number*entry size)+offset to start of arc entries 538.

Thus, to access a value in a transition entry, the index of the entry is first converted into a memory offset relative to the beginning of the grammar. This offset is then used to retrieve the value. This technique can be used when receiving an index from a rule entry or when the speech recognition engine returns a transition index for a word that it recognized in the speech signal.

The offset to the start of arc entries 538 and the number of entries in arc entries 538 is stored in header 502 in entries 534 and 536, respectively. The layout of each arc entry under one embodiment of the invention is shown in FIG. 9.

Each entry describes the characteristics of a transition and indicates a next transition that can be followed after the current transition. In addition, the organization of the entries in grammar 500 indicates how the transitions are structurally related. In particular, transitions that extend from a same state are grouped as contiguous entries in grammar 500. The last entry for a state includes a bit flag in a LAST field 904 that indicates that the transition is the last transition extending from that state. By using this technique, the present invention does not have to explicitly describe the states. Instead, the states may be inferred.

In particular, any transition that enters a state makes an indirect reference to the state by indicating that the next transition that can be followed is the first transition that extends from the state. This is done by placing the index of the next transition in NEXT ARC field 906 of the current transition entry. All of the transitions that leave the state can then be found by reading each entry from this first entry to the first entry that has the last flag set in LAST field 904. Thus, simply by specifying one transition that can follow the current transition, a current transition entry is able to indicate all possible transitions that can be followed after the current transition.

By not making direct reference to the states themselves, the present invention greatly reduces the space occupied by the grammar.

Each transition entry also includes a content index value, which appears as WORD/RULE INDEX 900 in FIG. 9. The content index designates a word or rule that is associated with the transition. If a rule is associated with the transition, INDEX 900 is an index into rule entries 532. By multiplying the index by the fixed size of each rule entry, the location of the rule entry can be easily determined. If a word is associated with the transition, INDEX 900 provides an offset into word string 520. In particular, the word offset indicates the number of characters and nulls to the first character of the word in the word string. For example, a word that begins at the twelfth character in the word string would have a word offset of "12". A bit flag in RULE REF field 902 indicates whether INDEX field 900 contains an index to a rule or an offset to a word.

Each transition entry also includes a SEMANTIC TAG field 908, which indicates whether a semantic tag is associated with the current transitions. The field contains a single-bit flag indicating the existence of semantic information for the transition. The description of the semantic information itself is found in semantic property entries 550, which are described further below.

A transition entry may also be associated with a weight value found in weight entries 544, described below. The weight value biases the recognizer toward or away from recognizing a particular word and is used by applications to control the behavior of the recognizer for certain words.

The number of weight entries and the location of the first weight entry in weight entries 544 are described by entry 540 and entry 542, respectively, of header section 502. If all of the transition entries have the same weight value (the default value of "1.0"), there is no need to store the weight entries. Thus, if the weight values are all the same, there are no weight entries and weight entry 540 is zero. If at least one transition has a weight value different than "1.0", there is a separate weight entry for each transition entry. Thus, if there were ten transition entries, and only one transition had a value different than "1.0", there would be ten weight entries.

Each weight entry contains an ARC INDEX field 1000 and a WEIGHT field 1002 as shown in FIG. 10. ARC INDEX field 1000 contains the index of a transition entry and WEIGHT field 1002 contains an offset into symbol string 526 to the first character of the weight value for that transition entry.

Header entries 546 and 548 indicate the number of semantic property entries 550 and the offset from the beginning of grammar 500 to the first semantic property entry, respectively. Semantic property entries 550 describe semantic tags and semantic values that are associated with one or more transitions. FIG. 11 provides a layout of one embodiment of a semantic property entry under the present invention.

In FIG. 11, field 1100 contains the index of the transition that is associated with this semantic information. Under most embodiments, the entries in semantic property entries 550 are ordered based on the indices in field 1100 so that entries 550 may be searched using an efficient search algorithm such as a binary search. Thus, when a transition is identified by the speech recognition engine, the semantic information for the arc transition is retrieved by searching for the transition's index in the semantic property entries.

The semantic tag's name and its semantic value are found using NAME OFFSET field 1102 and VALUE OFFSET field 1104. The values in both fields 1102 and 1104 are indices into symbol string 526 and provide the locations of the first characters of the semantic name and semantic value, respectively.

Under some embodiments, an application may also designate a name ID and a value ID for the semantic name and the semantic value. When a word associated with such semantic information is recognized, the name ID and the value ID are returned to the application. This allows the application to use the name ID and value ID directly in further processing without having to perform a string compare on the returned semantic information. Since the name ID and the value ID are a fixed size, they are placed directly in the semantic property entry in fields 1106 and 1108, respectively.

Under some embodiments of the present invention, context-free grammar engine 302 is able to move semantic information across transitions so that the semantic information is as far forward as possible in the grammar structure without introducing semantic ambiguity into the grammar. To avoid introducing ambiguity when adding rules to a dynamic rule during run-time, the compiler needs to know the starting transition and the ending transition associated with each semantic entry. Fields 1110, 1112, 1114, and 1116 provide that starting arc and ending arc information.

In particular, fields 1110 and 1114 provide the indices of the first transition and the last transition associated with the current semantic information may be placed. The semantic information can be placed on any transition that is along any path from the first transition to the last transition. The indices in fields 1110 and 1114 are the indices of the transition's entry in transition entries 538.

Fields 1112 and 1116 are PARALLEL FLAG fields for the first transition and the last transition, respectively. When one of these fields is set to "1", the context-free grammar engine must place the semantic information on all transitions that extend from the same state as the transition associated with the flag if it places the semantic information on the transition associated with the flag. Thus, if field 1112 is "1" and the context-free grammar engine wants to place semantic information on the first transition, it must also place the semantic information on any transition that extends from the same state as the first transition.

The last set of entries in data section 504 of FIG. 5 is resource entries 556. The number of resource entries in the grammar is designated in header entry 552 and the offset from the beginning of the grammar to the first resource entry is designated in header entry 554.

An example of a resource entry is shown in FIG. 12 and includes a RULE INDEX field 1200 and a RESOURCE INDEX field 1202. RULE INDEX field 1200 provides an index to the rule in rule entries 532 that is associated with the resource. RESOURCE INDEX field 1202 provides an index into symbol string 526 to the first character of a string of characters that describe the value of the resource.

Figure 13:
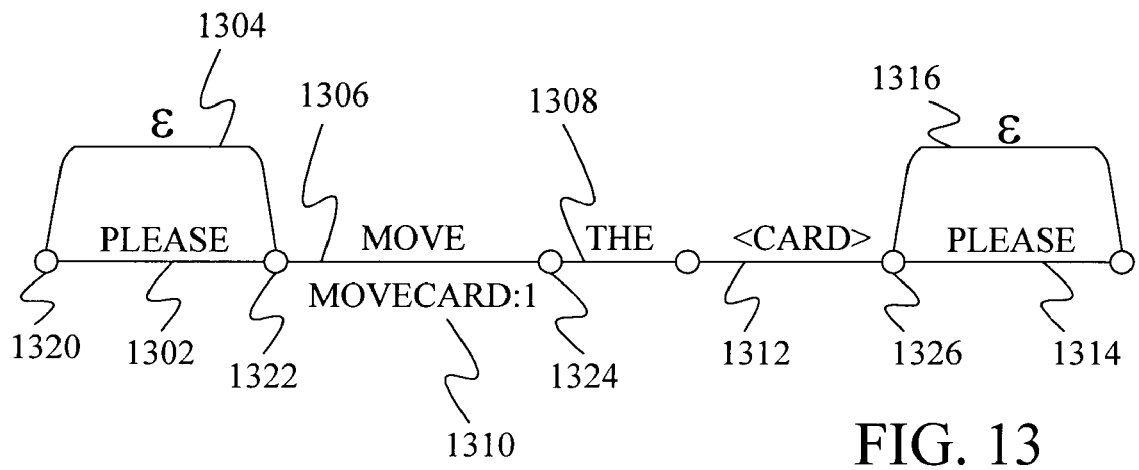
FIG. 13 shows a transition-and-state based description of a <move> rule.
Figure 14:
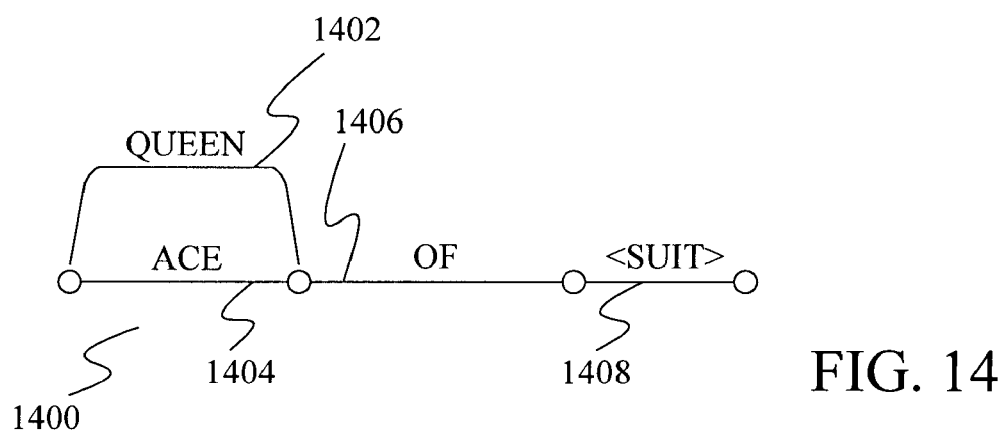
FIG. 14 shows a transition-and-state based description of a <card> rule.
Figure 15:
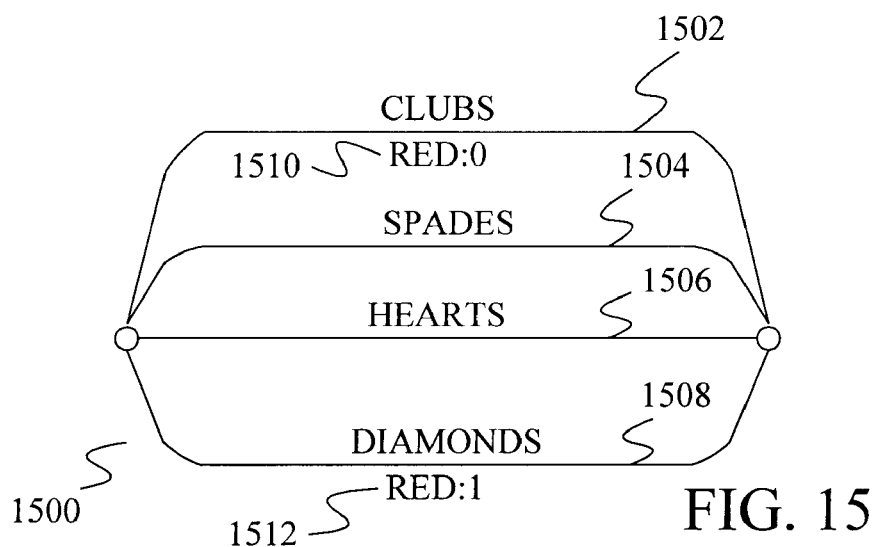
FIG. 15 shows a transition-and-state based description of a <suit> rule.

An example of a binary grammar for a grammar structure is described below. The grammar consists of three rule structures, which are shown in FIGS. 13, 14, and 15. The rule of FIG. 13 is named "MOVE", the rule of FIG. 14 is named "CARD", and the rule of FIG. 15 is named "SUIT".

"MOVE" rule 1300 of FIG. 13 begins with two parallel transitions 1302 and 1304 between states 1320 and 1322 of the rule. Transition 1302 is associated with the word "PLEASE" and transition 1304 is an epsilon transition that indicates that the word "PLEASE" is optional for the rule.

After transition 1304, there are two transitions 1306, and 1308 that are in series and represent the words "MOVE" and "THE", respectively. Transition 1306 also has semantic information 1310 associated with it. In particular, the semantic tag MOVECARD and the semantic value 1 are associated with transition 1306. Although semantic information 1310 is placed on transition 1306, is actually associated with the entire rule.

Transition 1312 comes after transition 1308 and is a rule reference transition. In particular, transition 1312 makes reference to CARD rule 1400 of FIG. 14. In order for transition 1312 to be recognized, an entire path through CARD rule 1400 must be recognized.

Transitions 1314 and 1316 are in parallel with each other and both extend after transition 1312. Transition 1314 is a word transition representing the word "PLEASE" and transition 1316 is an epsilon transition. Both of these transitions end at the end state of rule 1300.

Rule 1400 of FIG. 14 begins with two parallel word transitions 1402 and 1404, which represent the words "QUEEN" and "ACE", respectively. These transitions are followed by word transition 1406 for the word "OF", which is followed by rule transition 1408 for SUIT rule 1500 of FIG. 15. Thus, at least one path through rule 1500 must be recognized in order for rule 1400 to be recognized.

Rule 1500 contains four parallel word transitions 1502, 1504, 1506, and 1508 for the words "CLUBS", "SPADES", "HEARTS", and "DIAMONDS". Transitions 1502 and 1508 are also associated with semantic information 1510 and 1512, respectively. Semantic information 1510 includes the semantic tag "RED" and the semantic value "0". Semantic information 1512 includes the semantic tag "RED" and the semantic value "1".

FIGS. 16, 17, 18, 19, 20, and 21 show the contents of word string 520, symbol string 526, rule entries 532, arc entries 534, weight entries 544, and semantic property entries 550, respectively, for a grammar containing rules 1300, 1400 and 1500. Note that many of the entries are displayed in table form with a header row to indicate the content of each entry. Those skilled in the art will recognize that in the actual binary grammar there are no header rows. Instead, only the data is placed in the grammar.

In FIG. 11, each word found in rules 1300, 1400, and 1500 is found once in word string 1600. Note that even though the word please appears twice in rule 1300, it only appears once in word string 1600. Also note that the name of the rules do not appear in the word string. Instead, the rule names, the semantic tags and the semantic values appear in symbol string 1700 of FIG. 17.

In the rule entries of FIG. 18, each rule has a separate entry. In particular, rules 1300, 1400, and 1500 are represented by entries 1800, 1802, and 1804, respectively.

For rule 1300, field 1806 of entry 1800 indicates that its rule id is "01" and field 1808 indicates that it is a top-level rule. Fields 1810, 1812, and 1814, indicate that rule 1300 can be activated by a general activation command, that it does not have an associated interpreter, and that it is not imported. Field 1816 indicates that rule 1300 can be exported to other grammars and field 1818 indicates that there are no resources associated with the rule. Field 1820 indicates that rule 1300 is not dynamic.

Field 1806 of entry 1800 provides an index into symbol string 1700 for the name of rule 1300. This index value is "01". By counting characters and nulls from the beginning of symbol string 1700, the first character of the rule's name can be found. In this case, the first character is "M" in the rule name "MOVE". The entire name is retrieved by reading from the first character to the next null.

Field 1822 of entry 1800 provides an index into transition entries 1900 of FIG. 19 for the first transition of rule 1300. In this case, the transition index is "01", which is an index to entry 1904 of FIG. 19. Note that the first entry in transition entries 1900 is designated as entry "00".

Rule entry 1802 of FIG. 18 represents rule 1400 of FIG. 14. Because rule 1400 is embedded in another rule, it is not a top-level rule. This is indicated by a "0" in field 1808. In addition, entry 1802 indicates that rule 1400 can be activated by a general activation command, it does not have an interpreter and is not imported. Entry 1802 also indicates that rule 1400 can be exported, it does not have a resource and it is not dynamic.

Field 1806 of entry 1802 points to character index 17 in symbol string 1700 to indicate the name of rule 1400. In particular, this index points to character 1702, which is the first character in the word "CARD". The first transition for rule 1400 is listed in field 1822 as transition index "08" of transition entries 1900. This corresponds to transition entry 1906 in FIG. 19.

Rule 1500 is represented by rule entry 1804 in the rule entries of FIG. 18. Rule entry 1804 has the same settings as rule entry 1802 for the TOP-LEVEL, ACTIVE, INTERPRETER, IMPORTED, EXPORTED, RESOURCE and DYNAMIC fields. NAME INDEX field 1806 and FIRST ARC INDEX field 1822, however, are different. In particular, NAME INDEX field 1806 contains a value of "22", which points to character 1704 in symbol string 1700. This is the first character in the word "SUIT". FIRST ARC INDEX field 1822 has a value of "12", which points to entry 1908 of arc entries 1900.

In arc entries 1900, entry 1902 represents an ending state for a rule. When entry 1902 is listed as the next arc in NEXT ARC field 1916 of a transition entry, it is an indication that the transition for that transition entry terminates at the end of a rule.

As noted above, transition entry 1904 represents the first transition of rule 1300 of FIG. 13. In fact, entry 1904 represents epsilon transition 1304 of FIG. 13. Because it is an epsilon transition, it does not have a word or rule associated with it. As such, WORD/RULE INDEX field 1910 has a value of zero for entry 1904. RULE REFERENCE field 1912 and SEMANTIC TAG field 1918 indicate that transition 1304 is not a rule transition and that it does not have any semantic information associated with it. LAST field 1914 indicates that transition 1304 is not the last transition to extend from state 1320 of FIG. 13 and NEXT ARC field 1916 indicates that the entry for the next transition after transition 1304 has an index of "3". This corresponds to entry 1924 in FIG. 19.

Entry 1922 in FIG. 19 corresponds to transition 1302 of FIG. 13. As such, RULE REFERENCE field 1912 indicates that it is not a rule transition, and WORD/RULE INDEX field 1910 provides an offset value of "1" into word string 1600 of FIG. 16. This corresponds to word 1602, which is "PLEASE" in word string 1600.

LAST field 1914 in entry 1922 indicates that this transition is the last transition that extends from state 1320 of FIG. 13. As such, entry 1922 completes the implicit description of state 1320 that was begun by entry 1904. Note that state 1320 is not referred to directly under the present invention, but instead is inferred by placing entries 1904 and 1922 next to each other in arc entries 1900.

NEXT ARC field 1916 of entry 1922 indicates that the next transition after the transition of entry 1922 is described in entry 1924.

Entry 1924 describes transition 1306 of FIG. 13. Its WORD/RULE INDEX has a value of "8" thereby pointing to the first character in word 1604 in word string 1600. This corresponds to the word "move". Since transition 1306 is the only transition extending from state 1322 in FIG. 13, LAST field 1914 indicates that entry 1924 is the last entry for that state.

Because transition 1304 is associated with semantic information 1310, SEMANTIC TAG field 1918 has its bit flag set to "1" to indicate the existence of the semantic information. Lastly, NEXT ARC field 1916 indicates that the next transition is represented by the entry at index "4", which is entry 1926.

Entry 1926 represents transition 1308 of FIG. 13. Its WORD/RULE INDEX points to the word "THE", which is word 1606 in word string 1600. Its LAST field 1914 indicates that it is the only transition from state 1324, and its NEXT ARC field 1916 indicates that the next transition is represented by the entry at index "5", which is entry 1928.

Entry 1928 represents transition 1312 of FIG. 13. Since this is a rule transition, RULE REFERENCE field 1912 is set to "1" and the value in WORD/RULE INDEX field 1910 is an index into the rule entries of FIG. 18. In particular, field 1910 has a value of "2", which corresponds to rule entry 1802 in FIG. 18, the entry for "CARD" rule 1400.

Since transition 1312 is the only transition after transition 1308, LAST field 1914 indicates that entry 1928 is a last entry from a state. NEXT ARC field 1916 indicates that the next transition for entry 1928 is at index "6", which corresponds to entry 1930.

Entry 1930 represents transition 1316 of FIG. 13. Because it is an epsilon transition, it has a RULE/WORD INDEX value of zero. In addition, since this transition extends to the last state of rule 1300, its NEXT ARC field 1916 also contains a value of zero.

Because transition 1316 is just one of two transitions that extend from state 1326 of FIG. 13, LAST field 1914 is set to "0". This indicates that at least the next entry in arc entries 1900 extends from the same state as the transition of entry 1930.

The next entry after entry 1930 is entry 1932, which represents transition 1314 of FIG. 13. This transition is associated with the word "PLEASE" and as a result, WORD/RULE INDEX field 1910 points to the word "PLEASE", which appears as word 1602 in word string 1600. Note that entries 1922 and 1932 point to the same word in the word string. By doing this, the present invention reduces the space needed to represent words that appear multiple times in the grammar.

Transition 1314 is the last transition that extends from state 1326. As such, LAST field 1914 of entry 1932 is set to "1". Like transition 1316, transition 1314 also extends to the last state of rule 1300. As such, NEXT ARC field 1916 is set to "0" for entry 1932.

Entry 1906 of FIG. 19 represents the first transition of rule 1400. In particular, entry 1906 represents transition 1404 of rule 1400. Since transition 1404 is a word transition representing the word "ACE", WORD/RULE INDEX 1910 is set to "17", thereby making reference to the first character in the word "ACE", in word string 1600. NEXT ARC field 1916 of entry 1906 is set to "10" to indicate that the transition represented by entry 1936 follows the transition for entry 1906. Because transition 1404 is in parallel with transition 1402, LAST field 1914 of entry 1906 is set to "0".

Entry 1906 has a corresponding entry in weight entries 2000 of FIG. 20. In particular, a weight value other than "1.0" is set in weight entry 2002, which contains an ARC INDEX field 2004 and a WEIGHT field 2006. For entry 2002, ARC INDEX field 2004 has a value of "8", which is the index for entry 1906 in arc entries 1900, and WEIGHT field 2006 has a value of "39", which is an offset into symbol string 1700 of FIG. 17. In particular, the offset points to the value "0.8" in symbol string 1700, which is the weight value to be applied to the word "ACE".

Returning to the transition entries of FIG. 19, the next entry after entry 1906 is entry 1934, which represents word transition 1402 of FIG. 14. In entry 1934, WORD/RULE INDEX field 1910 is set to "21" to point to word 1608, which is the word "QUEEN" in FIG. 16. Entry 1934 has a corresponding weight entry 2008 in the weight entries of FIG. 20. To find this weight value, ARC INDEX 2004 is searched to find an index value that matches the arc index value of entry 1934. In particular, the weight entries are searched for an arc index value of "9". The weight value for entry 2008 is "42", which is an offset to the value "0.2" in symbol string 1700.

Note that all other entries in weight entries 2000 have the same offset of "35", which points to the value "1.0" in symbol string 1700.

Entry 1936 of transition entries 1900 describes transition 1406 of FIG. 14 and entry 1938 describes rule transition 1408 of FIG. 14. Because entry 1938 represents a rule transition, RULE REFERENCE field 1912 is set to "1" and WORD/RULE INDEX field 1910 makes reference to a rule entry in the rule entries of FIG. 18. In particular, field 1910 has an index value of "3", which is a reference to rule entry 1804 of FIG. 18.

Entries 1908, 1940, 1942, and 1944 of FIG. 19 represent transitions 1502, 1504, 1506, and 1508 of FIG. 15, respectively. Since transitions 1502 and 1504 contain semantic information, entries 1908 and 1944 have their SEMANTIC TAG flags 1918 set to "1".

FIG. 21 provides examples of semantic entries for the rules of FIGS. 13, 14, and 15. Entry 2100 represents the semantic information for transition 1306 of FIG. 13 and transition entry 1924 of FIG. 19. ARC INDEX field 2106 of entry 2100 contains the arc index, "3", of transition entry 1924. This ties semantic entry 2100 to transition entry 1924. NAME OFFSET 2108 and VALUE OFFSET 2210 of semantic entry 2100 indicate the position of the semantic tag and semantic value, respectively, in symbol string 1700. In particular, NAME OFFSET 2108 indicates that the semantic tag starts at character offset "6" in symbol string 1700 corresponding to the first character in the word "MOVECARD" and VALUE OFFSET 2108 indicates that the value starts at character offset "15" corresponding to the character "1".

NAME ID field 2112 and VALUE ID field 2114 provide alternative descriptions of the semantic information. In particular, NAME ID field 2112 has an integer value of "100" and VALUE ID field 2114 has an integer value of "1".

START ARC INDEX field 2116 and END ARC INDEX field 2120 indicate the first and last arc on which the semantic information of entry 2100 may be placed. In particular, START ARC index field 2116 indicates that the first arc that the semantic information can be placed on is represented by the entry at arc index "2". This corresponds to entry 1922 in FIG. 19 and transition 1302 for the word "PLEASE" in FIG. 13. END ARC INDEX field 2120 indicates that the last arc that the semantic information can be placed on is represented by the arc entry at index "7", which is entry 1932 for transition 1314 of FIG. 13.

Both START ARC INDEX 2116 and END ARC INDEX 2120 have their corresponding PARALLEL FLAG fields 2118 and 2122 set to "1". This indicates that both the starting arc and the ending arc are in parallel with at least one other arc. As can be seen from FIG. 13, starting arc 1302 is in parallel with epsilon transition 1304 and ending arc 1314 is in parallel with epsilon transition 1316.

Semantic entries 2102 and 2104 represent semantic information 1510 and 1512, respectively, of FIG. 15. Since both sets of semantic information have the same semantic tag, NAME OFFSET field 2108 has the same value in both entries. In particular, both entries have a value of "27" in NAME OFFSET field 2108, thereby making reference to the first character of the word "RED" in symbol string 1700.

The semantic information of entries 2102 and 2104 cannot be moved. As such, in both entries, the START ARC INDEX and the END ARC INDEX have the same index value. For entry 2102, the index value is "12" and for entry 2104, the index value is "15". Since the semantic information of entries 2102 and 2104 cannot be placed on a parallel transition, PARALLEL FLAGS 2118 and 2122 are set to "0" for both entries.

Although the present invention has been described with reference to particular embodiments, workers skilled in the art will recognize that changes may be made in form and detail without departing from the spirit and scope of the invention.

What is claimed is:

1. A computer-readable storage medium having encoded thereon computer-executable instructions that cause a processor to perform steps comprising:
   receiving a speech signal;
   accessing a data structure stored in memory to identify possible transitions from a state, the data structure representing a state-and-transition-based description of a speech grammar, the data structure comprising:
      a first transition entry representing a transition from a first state;
      a second transition entry representing a second transition from the first state, the second transition entry being contiguous with the first transition entry and having a last-transition value set to indicate that the second transition is the last transition from the first state;
   using the possible transitions from a state stored in the data structure to identify sequences of phonetic units represented by the speech signal.

2. The computer-readable storage medium of claim 1 wherein each transition entry has a fixed size.

3. The computer-readable storage medium of claim 2 wherein the data structure further comprises a word string comprising words found in the speech grammar.

4. The computer-readable storage medium of claim 3 wherein each transition entry has a content index value that designates content associated with the transition.

5. The computer-readable storage medium of claim 4 wherein at least one transition entry has a content index value that is an index into the word string.

6. A method comprising:
   providing a speech signal to a speech recognition engine executed by a processor;
   reading a next transition index from a transition entry in a state-and-transition-based binary grammar stored in a system memory accessible by the processor;
   reading information from each transition entry from the transition entry indexed by the next transition index to a transition entry that includes a last field flag that indicates that it is the last transition entry for a state, to obtain information for each transition that extends from the state; and
   using the information read from the transition entries to decode the speech signal into text.

7. The method of claim 6 wherein reading information from a transition entry comprises reading a content index value.

8. The method of claim 6 wherein reading information from a transition entry further comprises reading a rule ref field that indicates whether the content index value is an index to a word or an index to a rule.

9. The method of claim 8 wherein the content index value is an index to a word in a word string.

10. The method of claim 8 wherein the content index value is an index to a rule in a set of rule entries.

11. The method of claim 6 wherein each transition entry has a fixed size.

* * * * *